(12) United States Patent
Senac

(10) Patent No.: US 12,245,612 B2
(45) Date of Patent: Mar. 11, 2025

(54) DESSERT HOLDER

(71) Applicant: FANO'BANANA L.C.C., Rochester, MI (US)

(72) Inventor: Joseph Paul Senac, Rochester, MI (US)

(73) Assignee: FANO'BANANA L.C.C., Rochester, MI (US)

( * ) Notice: Subject to any disclaimer, the term of this patent is extended or adjusted under 35 U.S.C. 154(b) by 101 days.

(21) Appl. No.: 17/867,385

(22) Filed: Jul. 18, 2022

(65) Prior Publication Data

US 2023/0014252 A1 Jan. 19, 2023

Related U.S. Application Data

(60) Provisional application No. 63/222,773, filed on Jul. 16, 2021.

(51) Int. Cl.
*A23G 9/50* (2006.01)

(52) U.S. Cl.
CPC .................. *A23G 9/503* (2013.01)

(58) Field of Classification Search
CPC ..................................... A23G 9/503
USPC ....... 220/62.13, 657; D7/582, 576, 628, 681
See application file for complete search history.

(56) References Cited

U.S. PATENT DOCUMENTS

| | | | | |
|---|---|---|---|---|
| D171,422 S | * | 2/1954 | Parker | D7/559 |
| 3,139,348 A | * | 6/1964 | Reifers | B65D 85/34 |
| | | | | 206/521.1 |
| 3,727,307 A | * | 4/1973 | Berger | B26B 3/04 |
| | | | | 30/304 |
| 6,182,854 B1 | * | 2/2001 | Jimenez | A23G 9/44 |
| | | | | 426/115 |
| 6,286,705 B1 | * | 9/2001 | Mihalov | B29C 66/8432 |
| | | | | 220/675 |
| D472,344 S | * | 3/2003 | Angeletta | D28/7 |
| D479,953 S | * | 9/2003 | Stremple | D7/628 |
| D586,229 S | * | 2/2009 | Pallotto | D9/645 |
| D602,250 S | * | 10/2009 | Reiff | D3/270 |
| D604,111 S | * | 11/2009 | Braidotti | D7/628 |
| D672,207 S | * | 12/2012 | Ehrenhaus | D9/647 |
| D724,389 S | * | 3/2015 | Yip | D7/628 |
| D768,000 S | * | 10/2016 | Prueksapornpong | D9/425 |

(Continued)

FOREIGN PATENT DOCUMENTS

WO WO-2018229971 A1 * 12/2018

*Primary Examiner* — J. Gregory Pickett
*Assistant Examiner* — Niki M Eloshway
(74) *Attorney, Agent, or Firm* — Reising Ethington PC

(57) ABSTRACT

A dessert holder that enables a consumer to hold or grasp a banana (frozen or non-frozen) in such a way that various toppings, garnishes, trimmings, etc. that have been added to the banana do not readily spill over onto the consumer's hands. The dessert holder may also act as a thermal insulator so that the consumer is able to easily hold and eat a cold, frozen banana without making their hands uncomfortable. In one example, the dessert holder includes a main body section that is in the shape of a part of a banana and has first and second ends, as well as a flange section that is connected to the main body section at the second end, which is open to allow the banana to be inserted. The dessert holder may be made from an injection-moldable, food grade (e.g., FDA food grade), thermoplastic elastomer (TPE) or thermoplastic rubber.

16 Claims, 2 Drawing Sheets

(56) References Cited

U.S. PATENT DOCUMENTS

| | | | | |
|---|---|---|---|---|
| 2005/0083676 | A1* | 4/2005 | VanderSchuit | A47G 23/0216 362/84 |
| 2009/0108009 | A1* | 4/2009 | Yeung | A61J 9/00 215/11.2 |
| 2012/0171647 | A1* | 7/2012 | Samenuk | A47G 19/025 220/574.3 |
| 2014/0346182 | A1* | 11/2014 | Price | B65D 85/78 220/737 |
| 2020/0128854 | A1* | 4/2020 | King | A23G 9/221 |
| 2020/0315205 | A1* | 10/2020 | Rupp | A23G 9/503 |

\* cited by examiner

DESSERT HOLDER

RELATED APPLICATIONS

This application claims the benefit of U.S. Provisional Application No. 63/222,773, filed Jul. 16, 2021, the entire contents of which are herein incorporated by reference.

FIELD

The present invention generally relates to a dessert holder and, more particularly, to a dessert holder that enables a consumer to hold onto a banana with various toppings, garnishes, trimmings, etc. without getting their hands messy.

BACKGROUND

Desserts can be messy foods to consume and, if frozen, uncomfortable for a consumer to hold onto for an extended period of time. Generally, common dessert holders include cups, cones, wrappers, or sticks. Many dessert holders are concerned with packaging and orienting the dessert rather than consumer comfort or cleanliness during consumption.

SUMMARY

According to one embodiment, there is provided a dessert holder, comprising: a main body section being in the shape of a part of a banana and having a first end and a second end; and a flange section connected to the main body section at the second end and extending outwardly, wherein the second end of the main body section is open so that a banana can be inserted into the main body section.

In accordance with various embodiments, the dessert holder may have one or more of the following features, either singly or in any technically feasible combination:
  the main body section and the flange section are made from a material that is soft, flexible and elastic;
  the material is an injection-moldable, food grade thermoplastic elastomer (TPE) or thermoplastic rubber;
  the material is an injection-moldable, food grade thermoplastic elastomer (TPE) with a durometer or Shore A value that is between 10-40, inclusive;
  the material is an injection-moldable, food grade thermoplastic elastomer (TPE) with a thickness that is between 1.0 mm and 5.0 mm, inclusive;
  the main body section and the flange section are made from a material that is yellow in color to resemble a banana;
  the main body section and the flange section are integrally made of the same material so that the entire dessert holder can be manufactured in a single injection molding cycle;
  the first end is a tapered, closed end that is located at a lower part of the main body section when the dessert holder is in an upright position;
  the main body section is shorter along a lengthwise axis than a standard banana and is designed so that an upper part of a standard banana can extend out of and away from the dessert holder;
  the main body section includes an interior surface and an exterior surface and at least one of the interior surface and/or the exterior surface includes surface features in the form of ridges, ribs, channels, grooves, bumps, stipples, recesses, indentations and/or non-smooth sections;
  the interior surface of the main body section includes surface features that are generally aligned in a lengthwise axial direction so that melting toppings, garnishes and/or trimmings are channeled or guided to a bottom of the dessert holder near the first end of the main body section;
  the exterior surface of the main body section includes surface features that are designed to improve a grip that a consumer has on the dessert holder;
  the main body section includes an exterior surface with an area where indicia is applied so that the dessert holder acts as a souvenir or merchandising item;
  the main body section includes a plurality of lengthwise ridges that extend between the first end and the second end;
  the lengthwise ridges are designed to mimic edges or perimeters of different sections of a banana peel and converge towards the first end of the main body section;
  the flange section is an annular rim or flange that extends from the second end of the main body section and flares outward in a generally radial direction;
  the flange section includes an upper flange surface that is rounded or curved and smoothly flows into and blends with an interior surface of the main body section;
  the flange section has a thickness that is greater than a thickness of the main body section;
  the thickness of the flange section is between 2.0 mm and 5.0 mm, inclusive; and
  a process for manufacturing a dessert holder, wherein the process includes the step of: injection molding the main body section and the flange section from an injection-moldable, food grade thermoplastic elastomer (TPE) with a durometer or Shore A value that is between 10-40, inclusive.

DRAWINGS

DESCRIPTION

Figure 1:
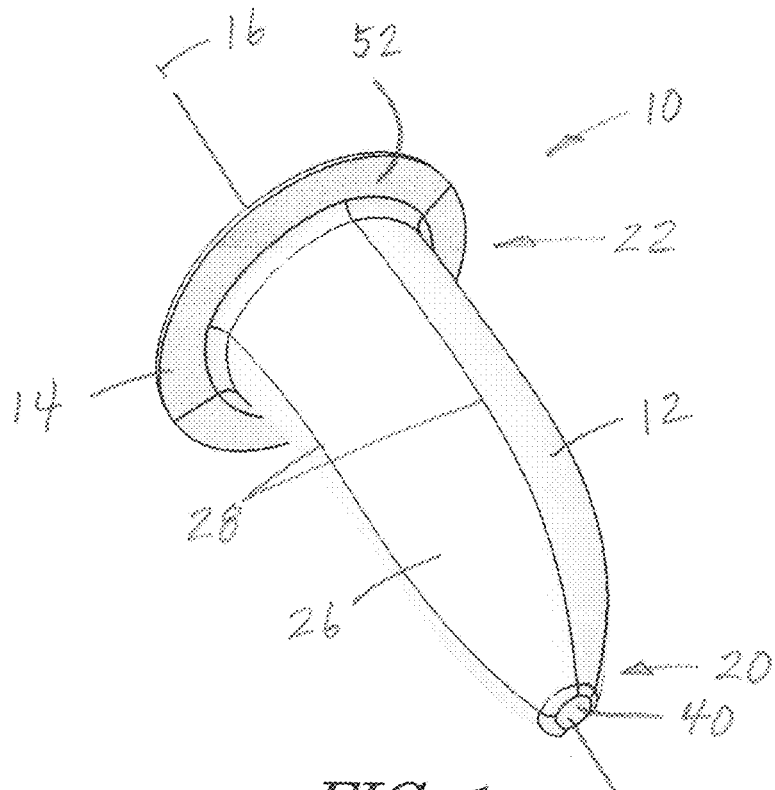
FIG. 1 is a perspective view of an example of a dessert holder.
Figure 2:
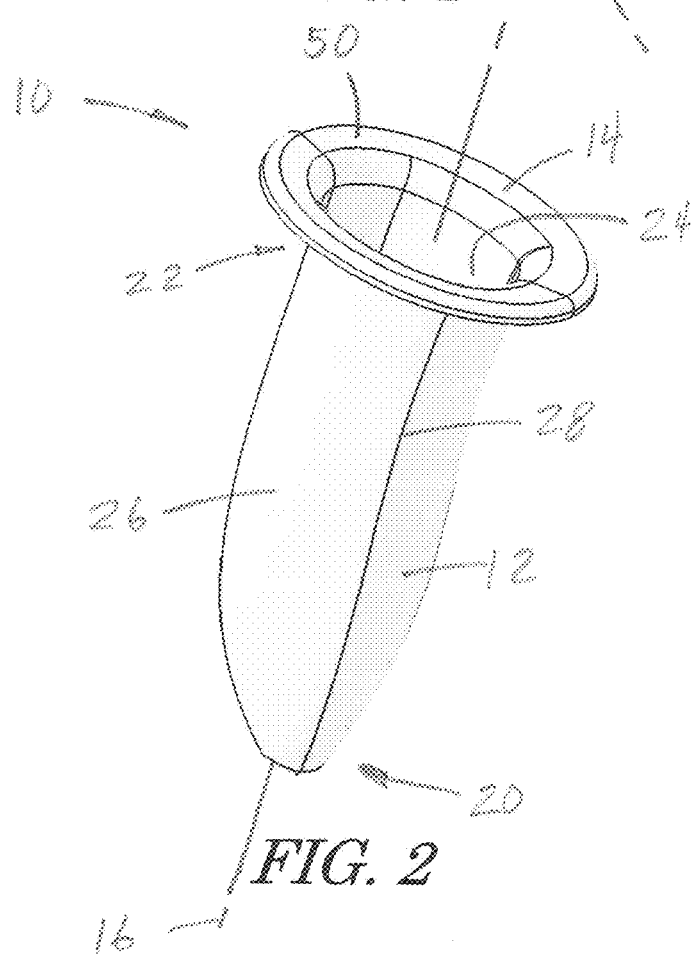
FIG. 2 is another perspective view of the dessert holder from FIG. 1 in an upright position.
Figure 3:
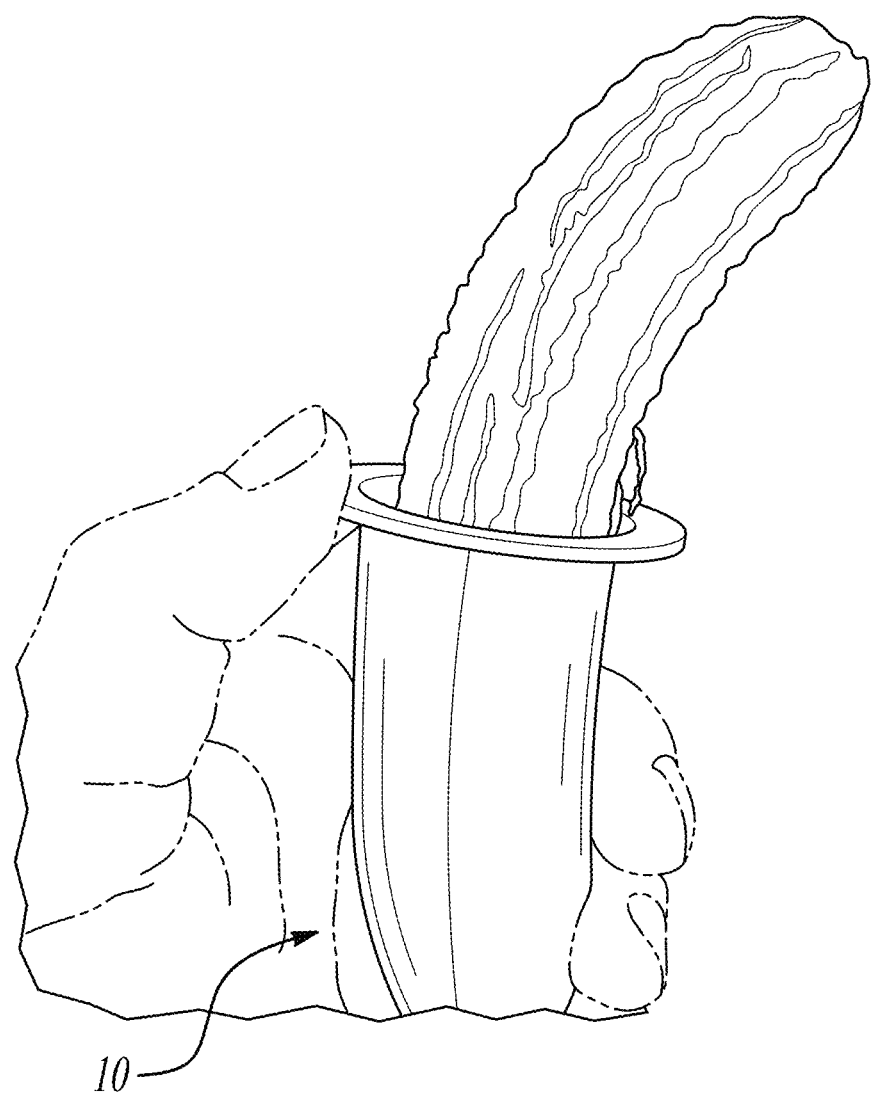
FIG. 3 shows the dessert holder from FIG. 1 in use.

The dessert holder disclosed herein is particularly well adapted for a banana (either a frozen or non-frozen banana), and is designed to enable a consumer to hold or grasp the banana in such a way that various toppings, garnishes, trimmings, etc. that have been added to the banana do not readily spill over onto the consumer's hands. In the event of a frozen banana, the dessert holder also acts as a thermal insulator so that the consumer is able to easily hold and eat the cold, frozen banana without making their hands uncomfortable. Turning now to FIGS. 1-3, there is shown an example of a dessert holder 10 where the dessert holder includes a main body section 12, a flange section 14, and a lengthwise axis 16.

Main body section 12 makes up the majority of the dessert holder 10 and is shaped and sized to receive a portion of a banana. Although not required, both the main body section 12 and the flange section 14 may be integrally made of the same material so that the entire dessert holder 10 can be easily manufactured in a single injection molding cycle. According to a non-limiting example, the main body section 12, the flange section 14, or both the main body and flange sections can be made from an injection-moldable, food grade (e.g., FDA food grade), thermoplastic elastomer (TPE) or thermoplastic rubber. One example of such a material is a colorable, injection-moldable, food grade TPE with a durometer or Shore A value that is between 10-40, inclusive, or more preferably between 20-30, inclusive. The material may have a thickness that is between 1.0 mm-5.0 mm, inclusive, or more preferably between 1.5 mm-4.0 mm, inclusive. Such a material is soft, flexible and elastic and is well suited from both a manufacturing standpoint (e.g., injection moldable) and a functionality standpoint (e.g., easy to hold and wash, also provide thermal insulation). In one example, the material is colored yellow to resemble a banana, which can produce a natural and immediate association in the mind of the consumer between the dessert holder 10 and the food it is intended to hold. Main body section 12 may have a first end 20, a second end 22, an interior surface 24, an exterior surface 26, and one or more lengthwise ridges 28.

First end 20 is a tapered, closed end located at the lower part of the main body section 12, when the dessert holder 10 is in a standard upright position. The first end 20 may culminate in a blunt or rounded surface 40 that is generally designed to complement the end of a peeled banana. By being closed, the first end 20 can capture any toppings, garnishes, trimmings, etc. that have melted or otherwise dripped down in the interior of the dessert holder 10, thereby preventing such items from getting on the consumer's hands, clothes, etc. The first end 20 is also where the various lengthwise ridges 28 come together, as will be subsequently described in more detail.

Second end 22 is an open end located at the upper part of the main body section 12, when the dessert holder 10 is in the standard or upright position, and is where the flange section 14 is integrally joined to or formed with the main body section 12. Those skilled in the art will notice that the main body section 12 is shorter along the lengthwise axis 16 than is a typical banana, which allows an upper part of the banana to extend out of and away from the dessert holder 10, thereby conveniently exposing it for eating (shown in FIG. 3). Such an arrangement is also useful for accommodating bananas of various lengths and sizes, as lower parts of both shorter and longer bananas can be accommodated in the main body section 12, while upper parts of such bananas can extend out of the holder for eating, no matter their length. The main body section 12, particularly in the area between the first and second ends 20, 22, may have a thickness that is between 1.0 mm-3.5 mm, inclusive, and more particularly between 1.5 mm-3.0 mm, inclusive.

Interior surface 24 and exterior surface 26, as their names suggest, are respectively on the interior and exterior of the dessert holder 10 and may be provided with one or more surface features. For example, the interior surface 24 and/or the exterior surface 26 may include surface features in the form of ridges, ribs, channels, grooves, bumps, stipples, recesses, indentations, non-smooth sections, etc. When such features are on the interior surface 24, they may be used to improve the grip the dessert holder 10 has on the banana so that it does not rotate or slip within the holder. It is also possible for such interior surface features to be generally aligned in the lengthwise axial direction so that melting toppings, garnishes, trimmings, etc. can be channeled or guided to the bottom of the holder near the first end 20, where they can be stored until later when the holder is cleaned. When surface features are on the exterior surface 26, they may be used to improve the grip the consumer has on the dessert holder 10, as opposed to exterior surface simply being smooth, or they can provide an area where indicia, such as a company, brand, sports team, geographic and/or other type of logo or symbol can be applied. In the event that such indicia is applied to the exterior surface 26, the dessert holder 10 could be marketed and sold as a souvenir or merchandising item. Of course, such surface features (either interior or exterior) are optional and are certainly not required.

Lengthwise ridges 28 extend in a generally lengthwise direction between the first and second ends 20, 22 of the main body section 12 and are designed to mimic the edges or perimeter of different sections of a banana peel. These ridges 28 can help breakup the otherwise smooth exterior surface 26 so that a consumer has something to grip onto while holding the dessert or banana holder 10. According to the illustrated embodiment, the lengthwise ridges 28 converge towards the first end 20 at the blunt surface 40, although this is not required.

Flange section 14 is an annular rim or flange that extends from the second end 22 of the main body section 12 and flares outward in a generally radial direction. The flange section 14 can be used to catch or otherwise prevent melting toppings, garnishes, trimmings, etc. from streaming down the side of the dessert holder and onto the consumer's hands. By providing a flange section 14 of adequate width (e.g., a flange that is between 2-10 mm, inclusive), the flange is able to catch and direct toppings and the like that melt back into the dessert holder 10 and towards the first end 20. In the illustrated embodiment, the flange section 14 includes an upper flange surface 50 and a lower flange surface 52. The upper flange surface 50 may be somewhat rounded or curved so that it smoothly flows into and blends with the interior surface 24 of the main body section 12 so as to form a single unbroken surface. The lower flange surface 52 may be flat or planar across its annular extent so that it joins with the exterior surface 26 in a more abrupt or distinct fashion, as best shown in FIG. 1. The flange section 14 may have a greater thickness than the main body section 12 and, according to a non-limiting example, has a thickness that is between 2.0 mm-5.0 mm, inclusive, and more particularly between 2.5 mm-4.0 mm, inclusive.

In manufacture, the dessert holder 10 may be injection molded from a colorable, injection-moldable, food grade TPE with a durometer or Shore A value that is between 10-40, inclusive, as mentioned below. Skilled artisans will appreciate that other manufacturing methods may be used as well.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more members or other items, are each to be construed as open-ended, meaning that that the listing is not to be considered as excluding other, additional members or items. Other terms are to be construed using their broadest reasonable meaning unless they are used in a context that requires a different interpretation.

The invention claimed is:

1. A dessert holder, comprising:
   a main body section being in the shape of a part of a banana and having a first end and a second end; and
   a flange section connected to the main body section at the second end and extending outwardly, the flange section extends around a circumference of the main body section in a continuous and unbroken manner and has a thickness that is between 2.0 mm-5.0 mm, inclusive,
   wherein the second end of the main body section is open so that a banana can only be inserted into the main body section from the second end,
   the main body section and the flange section are integrally formed in one piece that is made from an injection-moldable, food grade thermoplastic elastomer (TPE) or thermoplastic rubber that is soft, flexible and elastic, and
   the main body section includes a plurality of lengthwise ridges that extend between the first end and the second end.

2. The dessert holder of claim 1, wherein the injection-moldable, food grade thermoplastic elastomer (TPE) or thermoplastic rubber has a durometer or Shore A value that is between 10-40, inclusive.

3. The dessert holder of claim 1, wherein the injection-moldable, food grade thermoplastic elastomer (TPE) or thermoplastic rubber has, in an area of the main body, a thickness that is between 1.0 mm and 5.0 mm, inclusive.

4. The dessert holder of claim 1, wherein the main body section and the flange section are made from a material that is yellow in color to resemble a banana.

5. The dessert holder of claim 1, wherein the main body section and the flange section are integrally made of the same material so that the entire dessert holder can be manufactured in a single injection molding cycle.

6. The dessert holder of claim 1, wherein the first end is a tapered, closed end that is located at a lower part of the main body section when the dessert holder is in an upright position.

7. The dessert holder of claim 1, wherein the main body section is shorter along a lengthwise axis than is a standard banana and is designed so that an upper part of a standard banana can extend out of and away from the dessert holder.

8. The dessert holder of claim 1, wherein the main body section includes an interior surface and an exterior surface and at least one of the interior surface and/or the exterior surface includes surface features in the form of ridges, ribs, channels, grooves, bumps, stipples, recesses, indentations and/or non-smooth sections.

9. The dessert holder of claim 8, wherein the exterior surface of the main body section includes surface features that are designed to improve a grip that a consumer has on the dessert holder.

10. The dessert holder of claim 1, wherein the main body section includes an exterior surface with an area where indicia is applied so that the dessert holder acts as a souvenir or merchandising item.

11. The dessert holder of claim 1, wherein the lengthwise ridges are designed to mimic edges or perimeters of different sections of a banana peel and converge towards the first end of the main body section.

12. The dessert holder of claim 1, wherein the flange section is an annular rim or flange that extends from the second end of the main body section and flares outward in a generally radial direction.

13. The dessert holder of claim 12, wherein the flange section includes an upper flange surface that is rounded or curved and smoothly flows into and blends with an interior surface of the main body section.

14. The dessert holder of claim 12, wherein the flange section has a thickness that is greater than a thickness of the main body section.

15. A process for manufacturing the dessert holder of claim 1, wherein the process includes the step of:
   injection molding the main body section and the flange section from an injection-moldable, food grade thermoplastic elastomer (TPE) with a durometer or Shore A value that is between 10-40, inclusive.

16. A dessert holder, comprising:
   a main body section being in the shape of a part of a banana and having a first end, a second end; and
   a flange section connected to the main body section at the second end and extending outwardly, the flange section extends around a circumference of the main body section in a continuous and unbroken manner and has a thickness that is between 2.0 mm-5.0 mm, inclusive,
   wherein the second end of the main body section is open so that a banana can only be inserted into the main body section from the second end,
   the main body section and the flange section are integrally formed in one piece that is made from an injection-moldable, food grade thermoplastic elastomer (TPE) or thermoplastic rubber that is soft, flexible and elastic,
   the main body section includes an interior surface and an exterior surface and at least one of the interior surface and/or the exterior surface includes surface features in the form of ridges, ribs, channels, grooves, bumps, stipples, recesses, indentations and/or non-smooth sections, and
   the interior surface of the main body section includes surface features that are generally aligned in a lengthwise axial direction so that melting toppings, garnishes and/or trimmings are channeled or guided to a bottom of the dessert holder near the first end of the main body section.

* * * * *